United States Patent
Hata et al.

(10) Patent No.: US 7,017,550 B2
(45) Date of Patent: Mar. 28, 2006

(54) ELECTRONIC THROTTLE CONTROLLER

(75) Inventors: Koji Hata, Kariya (JP); Ken Uchiyama, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/058,692

(22) Filed: Feb. 16, 2005

(65) Prior Publication Data

US 2005/0193977 A1 Sep. 8, 2005

(30) Foreign Application Priority Data

Mar. 3, 2004 (JP) ............................. 2004-059436

(51) Int. Cl.
*F02D 9/00* (2006.01)

(52) U.S. Cl. .................................. 123/399; 73/118.1

(58) Field of Classification Search ................ 123/350, 123/319, 344, 349, 352, 361, 376, 403, 399; 73/116, 118.1
See application file for complete search history.

(56) References Cited

U.S. PATENT DOCUMENTS 5,964,202 A * 10/1999 Takagi et al. ............ 123/339.1
6,497,214 B1 * 12/2002 Yagi ............................ 123/399

FOREIGN PATENT DOCUMENTS

JP 2001 303976 10/2001

* cited by examiner

*Primary Examiner*—Tony M. Argenbright
(74) *Attorney, Agent, or Firm*—Nixon & Vanderhye P.C.

(57) ABSTRACT

In an electronic throttle controller, when an intake air amount detected by an air flow meter is smaller than a stall prevention judging-purpose each cylinder intake amount, a stall prevention adding amount "large" is added to intake throttle opening degree deviation, a DC motor is driven while neglecting a feedback control operation, and an opening degree of the intake throttle is controlled to be further opened from an actual preceding control position. When an execution number of the engine stop avoiding control is larger than a predetermined number within a predetermined period, an abnormal condition of a throttle position sensor is detected, and thus, energizing operation of the DC motor is stopped. The abnormal condition malfunction of the throttle position sensor can be firmly detected while an engine stall is avoided.

10 Claims, 7 Drawing Sheets

ELECTRONIC THROTTLE CONTROLLER

CROSS-REFERENCE TO RELATED APPLICATION

This application is based o Japanese Patent Application No. 2004-59436 filed on Mar. 03, 2004, the disclosure of which is incorporated herein by reference.

FIELD OF THE INVENTION

The present invention relates to an electronic throttle controller which drives a DC motor based upon deviation between a throttle opening degree signal outputted from a throttle position sensor and a control target value so as to control an opening degree of a throttle valve. More specifically, the present invention is directed to an electronic throttle controller for feedback-controlling the DC motor in such a manner that the deviation between the target throttle opening degree signal and the throttle opening degree signal outputted from the throttle position sensor is reduced.

BACKGROUND OF THE INVENTION

Conventionally, exhaust gas recycling apparatus equipped with exhaust gas recirculating tubes are installed in internal combustion engines, while the exhaust gas recirculating tubes are used to recirculate a portion of the exhaust gas of the internal combustion engines from engine exhaust tubes to engine air intake tubes. This is such a system that since the portion of the exhaust gas of the internal combustion engines is mixed with sucked air, maximum combustion temperatures are lowered so as to reduce harmful substances (for example, NOx) which are contained in the exhaust gas.

Under such a circumstance, very recently, even in diesel engines, throttle valves (namely, intake throttles) have been started to be utilized in response to such a request for further improving exhaust gas performance in such a manner that a large amount of exhaust recycling gas (EGR gas) which is recirculated via exhaust gas recirculating tubes to engine air intake tubes is entered into the engine air intake tubes. The intake throttle valves control newly sucked air amounts in such a way that when valve bodies of exhaust gas recirculating amount control valves (EGR control valves) which adjust recirculating amounts (EGR amounts) of the EGR gas are opened, the newly sucked air amount may be reduced. Also, generally speaking, as actuators for performing open/close control operations of these intake throttle valves, DC motors operable in fast control response characteristics are employed in order to prevent occurrences of smoke during acceleration operation.

On the other hand, electronic throttle controller (electronic throttle systems) are known in this technical field, while these electronic throttle controllers drive DC motors in response to depression amounts of accelerator pedals so as to control opening degrees of throttle valves. In this electronic throttle controller, a drive current is supplied to a DC motor based upon an accelerator opening degree signal which is outputted from an accelerator position sensor for sensing a depression amount (accelerator opening degree) of an accelerator pedal. Then, since the DC motor is driven, opening/closing operations of the throttle valve are controlled in order that an amount of air sucked to a cylinder of an engine can become an optimum air intake value. Then, the DC motor is equipped with a throttle position sensor capable of sensing a throttle opening degree in order to perform a positional control of the throttle valve. Thus, a feedback control is carried out based upon the proportional integral and differential control (PID) control with respect to the DC motor in such a manner that deviation between a throttle opening degree signal (position sensor signal) outputted from the throttle position sensor and an accelerator opening degree signal outputted from the accelerator position sensor is reduced to become zero.

When an abnormal condition happens to occur in the throttle position sensor for detecting the throttle opening degree, the positional control operation of the throttle valve cannot be carried out under better conditions. For example, when the throttle position sensor is brought into malfunction indicative of a small opening degree (line interruption, short-circuit, output fixing), the throttle valve is opened more and more due to the feedback control, so that such a difficulty may occur. That is, output power of an internal combustion engine become excessively high. Also, for instance, when the throttle position sensor is brought into malfunction indicative of a large opening degree (line interruption, short-circuit, output fixing), the throttle valve is closed more and more due to the feedback control, so that such a difficulty may occur. That is, the internal combustion engine is brought into engine stall. In order to solve these difficulties, the energizing operation to the DC motor is immediately stopped, and the throttle valve is fixed to the mechanical predetermined opening degree by employing, for example, a default spring. Thus, output power of the internal combustion engine is limited, and the saving drive may be realized. However, even when the throttle position sensor is instantaneously brought into an abnormal condition, since the energizing operation to the actuator is immediately stopped, there is another problem that drivability as to a vehicle is deteriorated.

As a consequence, in order to solve such a problem, the below-mentioned electronic throttle controller is known in the technical field (refer to, for example, Japanese Laid-open Patent Application No. 2001-303976, pages 1 to 7, FIG. 1 to FIG. 4). In this electronic throttle controller, the energizing operation to the actuator is continued even when the abnormal condition happens to occur in the throttle position sensor until a predetermined time has elapsed; and when the abnormal condition of the throttle position sensor is continued for a time period longer than, or equal to the predetermined time, which is detected, the energizing operation to the actuator is stopped, and then, the throttle valve is fixed to the mechanical predetermined opening degree by using, for example, a default spring. As a result, when the abnormal condition of the throttle position sensor happens to occur, while the drivability is not deteriorated, this electronic throttle controller is capable of avoiding that the output power of the internal combustion engine becomes excessively high, and the internal combustion engine is brought into the engine stall condition. However, in this conventional electronic throttle controller, if the predetermined time is set to a long time duration, when the throttle position sensor is brought into malfunction indicative of a large opening degree (line interruption, short-circuit, output fixing), the throttle valve is closed more and more due to the feedback control, so that the internal combustion engine is brought into the engine stall condition.

SUMMARY OF THE INVENTION

The present invention has an object to provide an electronic throttle controller capable of firmly detecting an abnormal condition as to at least one of a throttle valve, an actuator, and a throttle position sensor, while an engine stall condition is avoided.

In accordance with the present invention, an engine stop avoiding control operation is carried out in such a manner that when an air intake amount sensed by an air intake amount sensor is smaller than a stall prevention judging value (for example, stall preventing purpose each cylinder air intake amount) which is set in correspondence with a drive condition of an internal combustion engine, an actuator is driven while neglecting a feedback control operation by a first throttle opening degree control means so as to control to further open an opening degree of a throttle valve along a valve opening direction. Then, an abnormal condition as to at least one of the throttle valve, an actuator, and a throttle position sensor is detected when an execution frequency (for example, execution number) of the engine stop avoiding control by the second throttle opening degree control means per unit time is larger than, or equal to an abnormal condition judging value (for example, one to five times). The abnormal condition corresponds to, for instance, fixing malfunction of the throttle valve, abnormal condition malfunction of the actuator, or abnormal condition malfunction of the throttle position sensor. As a result, while avoiding the engine stall, the abnormal condition as to at least one of the throttle valve, the actuator, and the throttle position sensor can be firmly detected. Also, even when at least one of the throttle valve, the actuator, and the throttle position sensor is instantaneously brought into the abnormal condition, since the energizing operation to the actuator is not stopped, the electronic throttle controller of the present invention does not give an adverse influence to the drive condition of the internal combustion engine, but also does not deteriorate the drivability of the vehicle.

BRIEF DESCRIPTION OF THE DRAWING

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
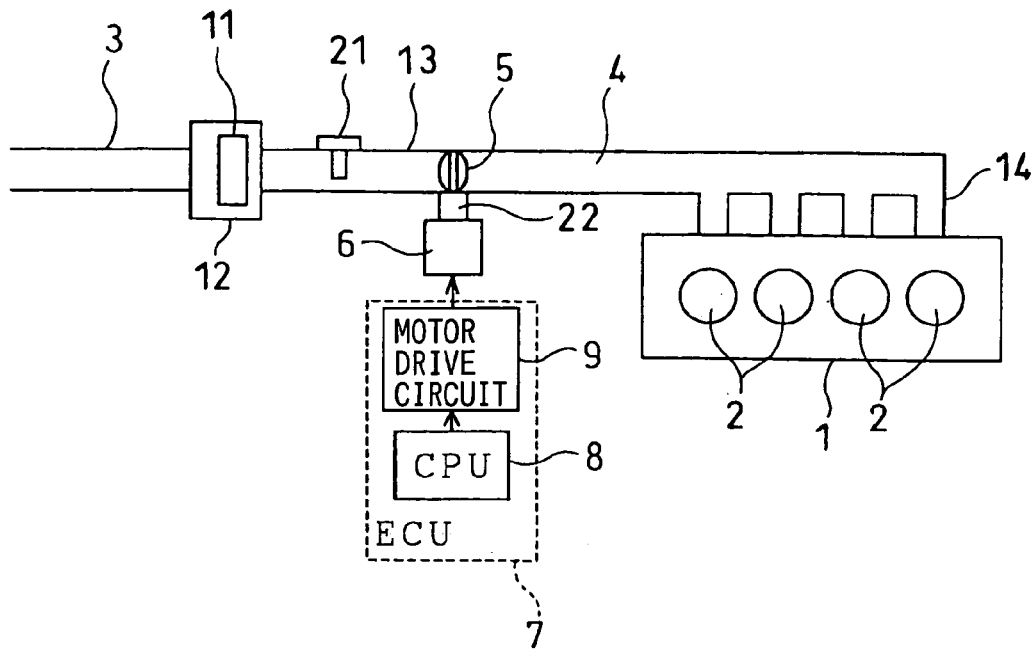
FIG. 1 is a schematic view of an engine and equipments according to a first embodiment of the present invention.

In accordance with a best mode for carrying out the present invention, such an object for firmly detecting at least one abnormal condition as to a throttle valve, an actuator, and a throttle position sensor while engine stall is avoided may be realized by employing an abnormal condition detecting means for detecting at least one abnormal condition among the throttle valve, the actuator, and the throttle position sensor when an execution frequency of engine stop avoiding control per unit time is larger than, or equal to an abnormal judging valve.

[First Embodiment]

FIG. 1 to FIG. 8 indicate a first embodiment of the present invention, namely, are diagrams for representing an engine and peripheral appliances thereof.

An engine control system, according to this first embodiment, is equipped with a common rail type injecting apparatus (not shown), an exhaust gas recycling apparatus (EGR apparatus, not shown), an electronic throttle controller, and an engine control unit (electronic control unit will be referred to as "ECU" hereinafter) 7. The common rail type injecting apparatus injects/supplies high-pressure fuel into a combustion chamber 2 of each cylinder of an internal combustion engine (will be referred to as "engine" hereinafter) 1 such as a multi-cylinder diesel engine which is mounted on a vehicle, for example, an automobile. The exhaust gas recycling apparatus adjusts an exhaust gas recirculating amount by which a portion of exhaust gas of the engine 1 is recirculated from an engine exhaust tube to an engine air intake tube 3. The electronic throttle controller adjusts an intake amount of air which is sucked into the combustion chamber 2 of each cylinder of the engine 1. The engine control unit 7 electronically controls respective actuators of the common rail type injecting apparatus, the exhaust gas recycling apparatus, and the electronic throttle controller.

The common rail type fuel injecting apparatus is equipped with a common rail (not shown), a supply pump (fuel supply pump, not shown), and a plurality of injectors ("INJ", not shown). The common rail accumulates high-pressure fuel equivalent to injection pressure of fuel. The supply pump pressures the fuel which has been sucked into a pressure applying chamber via an intake controlling valve (SCV, not shown) functioning as an actuator so as to produce high-pressure fuel, and then, supplies this high-pressure fuel to the common rail under pressure. The plural injectors inject the high-pressure fuel which has been accumulated in the common rail into the combustion chambers 2 of the respective cylinders of the engine 1. It should be noted that actuators such as electromagnetic valves for driving nozzle needles (valve bodies) along valve opening directions are provided in the plural injectors. Also, the exhaust gas recycling apparatus is equipped with an exhaust gas recycling tube (not shown), and an exhaust gas recirculating amount control valve (EGR control valve, not shown). The exhaust gas recycling tube is employed in order that a portion of exhaust gas flowing through an exhaust gas passage of an engine exhaust tube is conducted into an air intake passage 4 of the engine air intake tube 3. The exhaust gas recirculating amount control valve variably controls a recirculating amount (EGR amount) of EGR gas which flows through an exhaust gas recirculating flow path of this exhaust gas recirculating tube. It should be noted that an actuator such as an electromagnetic valve for driving a valve (valve body) along a valve opening direction is provided in the EGR control valve.

Next, a schematic arrangement of the electronic throttle controller of this first embodiment will now be explained with reference to FIG. 1 and FIG. 2. In this case, FIG. 2 is a perspective view for indicating a major construction of the electronic throttle controller. The electronic throttle controller corresponds to an internal combustion-purpose air intake control apparatus equipped with an engine air intake tube 3, a throttle valve 5, a valve energizing means (not shown) such as a default spring, an electric motor (will be referred to as "DC motor" hereinafter) 6, and the above-described ECU 7. The engine air intake tube 3 is employed so as to supply sucked air into the combustion chambers 2 of the respective cylinders of the engine 1. The throttle valve 5 adjusts an amount of newly sucked air which flows through the air intake passage 4 of the engine air intake tube 3. The valve energizing means energizes the throttle valve 5 along the valve opening direction. The DC motor 6 functions as an actuator for driving the throttle valve 5 along the valve opening direction. The ECU 7 electronically controls the DC motor 6. It should be understood that the default spring constitutes a fully opened position holding means for holding a throttle opening degree equivalent to such a position that the throttle valve 5 is mechanically opened in a valve fully opened condition when the supply of the electronic power to the DC motor 6 is stopped.

An intake (air suction) valve (not shown) for opening/closing an air intake port, and an exhaust valve (not shown) for opening/closing an air exhaust port are mounted on a cylinder head of the engine 1. Then, the air intake port of the engine 1 is constituted in such a manner that both the EGR gas and the newly sucked air are supplied via the air intake passage 4 of the engine air intake tube 3. Also, the exhaust port of the engine 1 is constituted in such a manner that the exhaust gas is exhausted to the exhaust passage of the engine exhaust tube. In this case, an air cleaner case 12 is mounted on the side of an upper stream of the engine air intake tube 3, while this air cleaner case 12 stores thereinto an air cleaner 11 which filters the newly sucked air.

The engine air intake tube 3 owns a throttle body 13, and an intake manifold (air intake manifold) 14. The throttle body 13 stores thereinto the throttle valve 5 in freely opening/closing condition. The intake manifold 14 is provided on the lower stream side rather than this throttle body 13. The intake manifold 14 connects the air intake passage 4 within the engine air intake tube 3 to the air intake port of each cylinder of the engine 1, and distributes the newly sucked air from the air intake passage 4 to the combustion chambers 2 of the respective cylinders of the engine 1. It should also be noted that a turbo charger for charging newly sucked air of the engine 1 may be alternatively provided between the air cleaner case 12 and the throttle body 13. Also, an output port of the exhaust gas recirculating tube of the exhaust gas recycling apparatus may be alternatively provided on the lower stream side (or upper stream side) rather than the throttle body 13.

The throttle valve 5 has been manufactured by employing either a metal material or a resin material and made in a substantially disk shape. This throttle valve 5 corresponds to the butterfly valve for controlling the amount of the newly sucked air which is sucked to the combustion chamber 2 of each of the cylinders of the engine 1. This butterfly valve is fastened to be fixed to a shaft 15 by employing a screw under such a condition that this butterfly valve has been inserted into a valve insertion hole formed in the shaft 15. The shaft 15 owns a valve holding portion which holds the throttle valve 5, and has been formed in a rod shape by a metal material. It should be understood that both sides of the valve-holding portion of the shaft 15 is rotatably supported to a shaft-bearing portion of the throttle body 13.

Then, since the DC motor 6 is electrically energized, the throttle valve 5 is controlled in such a manner that an opening degree (throttle opening degree) of the throttle valve 5 is controlled within a valve actuation range from a valve fully closed position up to a valve fully opened position by the driving force of the DC motor 6. Also, when the throttle valve 5 is stopped at the valve fully closed position (refer to FIG. 2), the newly sucked air can be interrupted, and engine vibrations occurred when the engine 1 is stopped can be reduced. It should also be noted that in this embodiment, even when an idling operation is performed, the throttle opening degree is controlled by the driving force of the DC motor 6. As a consequence, the newly sucked air amount is controlled, and it is so controlled that a revolution number of the engine 1 is made coincident with a target idle revolution number. In this first embodiment, when the supply of the electric power to the DC motor 6 is stopped, the throttle valve 5 is returned to the valve fully opened position by the energizing force of the default spring, and thus, the throttle opening degree is brought into the fully opened condition.

The DC motor 6 is a brushless DC motor which is constituted by a rotor and a stator, while a rotor core having a permanent magnet is provided with the rotor, and also, a stator core on which an armature coil has been wound is provided with the stator. The rotor is formed in an integral form with a power shaft (motor shaft). The stator is arranged opposite to an outer peripheral side of this rotor. It should also be noted that a reduction gear mechanism may be alternatively provided between the power shaft of the DC motor 6 and the shaft of the throttle valve 5, and this reduction gear mechanism reduces a rotation speed of the power shaft of the DC motor 6 to become a predetermined speed reduction ratio. Alternatively, instead of the brushless DC motor, a DC motor equipped with a brush, and an AC motor such as a three-phase induction motor may be employed.

Figure 2:
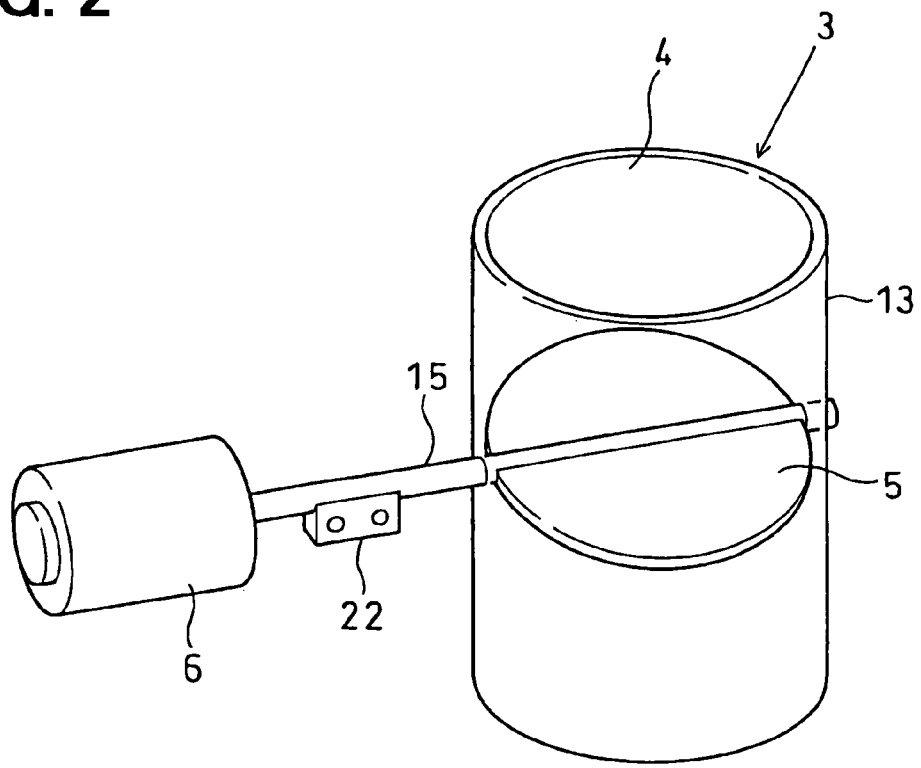
FIG. 2 is a perspective view of a throttle valve controller according to the first embodiment.

In this case, as shown in FIG. 1, the ECU 7 is provided with a microcomputer, a pump drive circuit, an injector drive circuit, an EGR drive circuit, and a motor drive circuit 9. The microcomputer is arranged by employing the well-known arrangement such as a CPU 8 which executes a control process operation and a calculation process operation; a storage device (various memories e.g., ROM, EEPROM, RAM, or standby RAM) which stores thereinto various sorts of programs and data; and various functions such as an input circuit, an output circuit, and a power supply circuit. The pump drive circuit supplies an SCV drive current to the air intake amount controlling valve of the supply pump. The injector drive circuit supplies an INJ drive current to the electromagnetic valve of the injector. The EGR drive circuit supplies an EGR drive current to the actuator of the EGR control valve. The motor drive circuit 9 supplies a motor drive current to the DC motor 6 of the throttle valve 5. Then, the ECU 7 is arranged to execute a feedback control operation in such a manner that when an ignition switch is turned ON (IG·ON), for example, fuel pressure (common rail pressure) within the common rail, an exhaust gas recirculation amount (EGR amount), and a newly sucked air amount may become various control command values based upon both the control program stored in the memory and the control logic.

The ECU 7 is arranged in such a manner that sensor signals derived from various sorts of sensors are A/D-converted by an A/D converter, and thereafter, the digital sensor data are entered to the microcomputer built in the ECU 7. These sensors are constituted by a lift amount sensor (not shown), a crank angle sensor (not shown), an accelerator position sensor (not shown), a cooling water temperature (not shown), a fuel temperature sensor (not shown), an air flow meter 21, a throttle position sensor 22, and the like. The lift amount sensor converts a lift amount of the valve of the EGR control valve into an electric signal (valve lift amount signal). The crank angle sensor senses a rotation angle of the crankshaft of the engine 1. The accelerator position sensor senses a depression amount of an accelerator pedal by a car driver (namely, accelerator operating amount). The cooling water temperature sensor senses a temperature (THW) of engine cooling water. The fuel temperature sensor senses a temperature (THF) of fuel. The crank angle sensor is constituted by a pick-up coil which converts a rotation angle of the crank shaft of the engine 1 into an electric signal (NE pulse signal), and outputs an NE pulse signal every, for example, 30° CA (crank angle). Then, the ECU 7 may function as a revolution speed detecting means for detecting a revolution speed of the engine 1 (will be referred to as "engine revolution number" hereinafter, i.e., NE) by measuring time intervals of NE pulse signals outputted from the crank angle sensor.

The CPU 8 owns a calculation function (injection amount setting means) which calculates a command injection amount (Q) by adding an injection amount correcting amount to a fundamental injection amount. The injection amount correcting amount corresponds to the engine cooling water temperature (THW) sensed by the cooling water temperature sensor, and the fuel temperature (THF) sensed by the fuel temperature sensor. Also, the ECU 7 owns a calculation function (injection timing setting means) which calculates an injection command pulse length (command injection time period: TQFIN) corresponding to energizing time of the electromagnetic valve of the injector based upon the fuel pressure (common rail pressure: PC) within the common rail sensed by the fuel pressure sensor, and either the fundamental injection amount or the command injection amount (Q). Then, the CPU 8 owns a calculation function (fuel pressure setting means) which calculates target fuel pressure (PFIN) by employing the engine revolution number (NE), and either the fundamental injection amount or the command injection amount (Q).

Also, the pump drive circuit built in the ECU 7 is arranged so as to perform a feedback control operation based upon either the proportional integral and differential control (PID control) or the proportional integral control (PI control), which are known in the art, with respect to the air intake amount control valve of the supply pump in such a manner that deviation between the common rail pressure (PC) and the target fuel pressure (PFIN) in order to achieve the target fuel pressure (PFIN). Also, the CPU 8 has a calculation function (target throttle opening degree setting means) which calculates a control target value (target throttle opening degree) based upon the engine revolution number (NE) and either the fundamental injection amount or the command injection amount (Q).

Also, the motor drive circuit 9 built in the ECU 7 corresponds to such a circuit which produces an output current DUTY from an output DUTY (control amount) calculated as a duty ratio signal which has been PWM-converted, and then, outputs this output current DUTY to the DC motor 6, while PWM is abbreviated from a pulse width modulation. That is, the motor drive circuit 9 produces the output current DUTY based upon opening degree deviation between the control target value (target throttle opening degree) which is set in correspondence with a drive condition of the engine 1, and an actual throttle opening degree (position sensor signal) in order to reduce this deviation. This implies that the motor drive circuit 9 adjusts a ratio of ON/OFF status of control pulse signal per unit time in correspondence with the opening degree deviation between the target throttle opening degree and the actual throttle opening degree. The control pulse signal corresponds to a pulse-shaped motor drive signal, and the ON/OFF ratio implies a duty ratio. As a result, in the DC motor 6, drive force (namely, motor power shaft torque) corresponding to the output current DUTY is produced, and thus, the actual throttle opening degree of the throttle valve 5 is finally made coincident with the target throttle opening degree.

In this example, the air flow meter 21 corresponds to an air intake amount sensor which is mounted on the engine air intake tube 3 located on the lower stream side rather than the air cleaner case 12. The airflow meter 21 converts a newly sucked air amount (for example, air intake amount per cylinder: AFSYLF) into an electric signal (air intake amount signal) so as to output such an information that how amount the air is sucked to the ECU 7. This air flow meter 21 corresponds to such an air intake amount sensor (potentiometer type air flow meter) by which an amount of sucked air flowing through the air intake passage 4 of the engine air intake tube 3 is converted into a voltage ratio by way of, for example, a potentiometer so as to be detected. It should also be noted that instead of the air flow meter 21 of this first embodiment, a speed density system may be alternatively employed. That is, in this speed density system, negative pressure of the air intake tube provided on the lower stream side rather than the throttle valve 5 is detected by a semiconductor type pressure sensor, and then, an air intake amount is indirectly acquired by calculating the negative pressure of the air intake tube and the engine revolution number by the ECU 7. Further, other air intake amount detecting methods such as the Karman vortex street type sensor method, or a heat wire method may be alternatively employed.

The throttle position sensor 22 corresponds, to a throttle opening degree sensor by which a valve opening degree of the throttle valve 5 is converted into an electric signal (position sensor signal), and this sensor outputs such an information that how degree the throttle valve 5 is opened to the ECU 7. This throttle position sensor 22 contains a magnetic field generating source which is integrally mounted on the shaft 15, and a non-contact type magnetic detecting element for producing electromotive force in response to a magnetic field generated by the magnetic field generating source. It should also be noted that as the magnetic detecting element, a Hall-effect IC, a Hall effect element, or a magnetic resistance element is employed. Instead of the throttle position sensor 22 of this embodiment, such a potentiometer system may be alternatively employed in which a potentiometer is moved in conjunction with the throttle valve 5 so as to output a voltage signal which is directly proportional to a throttle opening degree.

Control Method of First Embodiment

Referring now to FIG. 1 to FIG. 8, a simple explanation is made of a control method for controlling the electronic throttle controller, according to this first embodiment. Now, a method for calculating an output voltage duty (output DUTY) to the DC motor 6 is indicated in control logic of FIG. 3 and FIG. 4. The CPU 8 employed in the ECU 7 of this first embodiment is constituted by a target throttle opening degree setting means 31; an opening degree deviation calculating means (calculator) 32; a first and second stall preventing/adding means (adder) 33; a first throttle opening degree control means 34; a second throttle opening degree control means (engine stop avoiding control requesting means (ESACRM) 35, engine stop avoiding control (ES-ACM) 36); an abnormal condition detecting means (ACDM) 37; a means 38 for prohibiting power supply to the motor (namely, motor power supply prohibiting means); and a means 39 for notifying an abnormal condition to a car driver (namely, abnormal condition warning means), and the like.

First, the target throttle opening degree setting means 31 executes a calculation process operation. In this target throttle opening degree setting means 31, an engine revolution number (NE) is acquired from the revolution speed detecting means such as the crank angle sensor; a command injection amount (Q) is acquired from the injection amount setting means; and a two-dimensional map is read out from the memory such as the ROM or EEPROM. This two-dimensional map has been formed by previously measuring a relationship among the engine revolution number (NE), the command injection amount (Q), and the target throttle opening degree by executing an experiment, or the like. Then, in this target throttle opening degree setting means 31, an intake throttle target throttle opening degree is set by employing this two-dimensional map.

In this case, the intake throttle target throttle opening degree has been set in this two-dimensional map as follows: That is, in such a case that an engine revolution number (NE) is smaller than, or equal to the idling revolution number (for example, 850 rpm), the intake throttle target throttle opening degree has been set to such a valve opening degree equivalent to the valve fully opened position of the throttle valve 5. Also, in other cases, the intake throttle target throttle opening degree has been set in such a trend that the higher the engine revolution number (NE) is increased, and also, the larger the command injection amount (Q) is increased, the larger the intake throttle target throttle opening degree is substantially increased.

Next, the calculator 32 executes a calculation process operation. In this calculator 32, intake throttle opening degree deviation is calculated from both the intake throttle target throttle opening degree, and a position sensor signal outputted from the throttle position sensor 32. Next, the adder 33 performs a calculation operation. In this adder 33, in the case that a request for avoiding the engine stall is outputted from the engine stop avoiding control requesting means (ESACRM) 35 of the control logic (namely, present invention) of FIG. 4, both the first and second stall preventing adding amounts outputted from the engine stop avoiding control means (ESACM) 36 of the control logic of FIG. 4 are added to the intake throttle opening degree.

In the case that the request for avoiding the engine stall is outputted, since this calculation process operation is carried out, the intake throttle opening degree deviation is increased irrespective of the intake throttle opening degree deviation which is actually recognized by the ECU 7, and then, the throttle valve 5 can be forcibly opened by using the drive force of the DC motor 6 while neglecting the throttle position sensor signal (position sensor signal) outputted from the throttle position sensor 22.

On the other hand, when an intake throttle control executing flag has been set to "1", a control signal is outputted from the first throttle opening degree control means 34 to the motor drive circuit 9 built in the ECU 7. Then, the motor drive circuit 9 produces an output current DUTY and drives (supplying of electric power) the DC motor 6 by this output current DUTY. The motor drive circuit 9 produces this output current DUTY from the output DUTY (control amount) which has been calculated as the PWM (pulse width modulation)-converted duty ratio signal based upon the opening degree deviation between the target throttle opening degree and the actual throttle opening degree (position sensor signal) in order to reduce this deviation to become zero. As a result, in the DC motor 6, drive force (namely, motor power shaft torque) corresponding to the output current DUTY is generated, and the actual throttle opening degree of the throttle valve 5 is finally made coincident with the target throttle opening degree. It should also be understood that the motor drive circuit 9 may be alternatively arranged by executing such a feedback control operation that either the proportional integral and differential control (PID control) or the proportional integral control (PI control), which are well known in the art, is carried out with respect to the DC motor 6 in order to reduce the opening degree deviation between the target throttle opening degree and the actual throttle opening degree to become zero.

Figure 4:
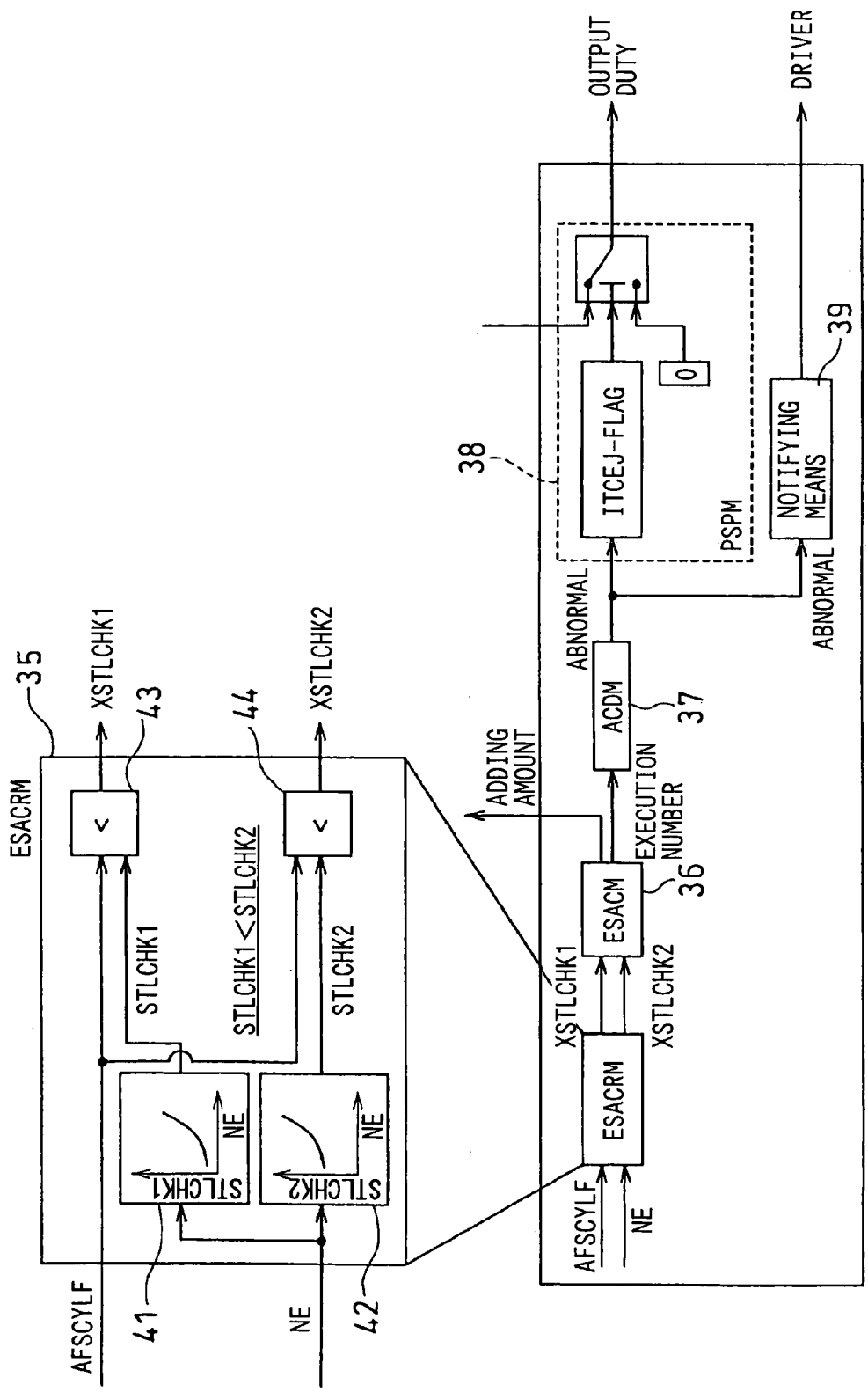
FIG. 4 is a block diagram showing a control logic according to the first embodiment.

In the control logic (namely, present invention) of FIG. 4, first, the engine stop avoiding control requesting means (second throttle opening degree control means) 35 executes a calculation process operation. In this engine stop avoiding control requesting means (ESACRM) 35, an engine revolution number (NE) is acquired from the revolution speed detecting means such as the crank angle sensor; and a one-dimensional map is read out from the memory such as the ROM or EEPROM. This one-dimensional map has been formed by previously measuring a relationship between the engine revolution number (NE), and a stall prevention judging-purpose intake amount 1 per cylinder (first stall prevention judging value: STLCHK 1) by executing an experiment, or the like. Then, the ECU 7 sets the stall prevention judging-purpose intake amount 1 per cylinder (STLCHK 1) by employing this one-dimensional map in a first each cylinder intake amount setting means 41.

Also, in the engine stop avoiding control requesting means (ESACRM) 35, the engine revolution number (NE) is acquired from the revolution speed detecting means such as the crank angle sensor, and a one-dimensional map is read out from the memory such as the RON, or EEPROM. This one-dimensional map has been formed by previously measuring a relationship between the engine revolution number (NE) and a stall prevention judging-purpose intake amount 2 per cylinder (STLCHK 2) by executing an experiment, or the like. Then, the ECU 7 sets the stall prevention judging-purpose intake amount 2 per cylinder (second stall prevention judging value: STLCHK 2) by employing this one-dimensional map in a second each cylinder intake amount setting means 42. It should be understood that STLCHK 1 <STLCHK 2. In this case, the stall prevention judging-purpose each cylinder intake amounts 1 and 2 (STLCHK 1 and 2) are set in such a trend that the higher the engine revolution number (NE) is increased, the larger these intake amounts 1 and 2 are increased.

Next, in the engine stop avoiding control requesting means (ESACRM) 35, the each cylinder air intake amount (AFSYLF) detected by the air flow meter 21 is acquired. Then, a first comparator 43 compares as to whether or not the each cylinder air intake amount (AFSYLF) is smaller than the stall prevention judging-purpose each cylinder intake amount 1 (STLCHK 1). As a result of this comparison, in such a case that the each cylinder air intake amount (AFSYLF) is smaller than the stall prevention judging-purpose each cylinder intake amount 1 (STLCHK 1), the stall prevention judging flag 1 (XSTLCHK 1) is set to "1 (stall prevention judgment success)", and then, a request for avoiding the engine stop is outputted from the engine stop avoiding control requesting means (ESACRM) 35.

Also, a second comparator 44 compares as to whether or not the each cylinder air intake amount (AFSYLF) is smaller than the stall prevention judging-purpose each cylinder intake amount 2 (STLCHK 2). As a result of this comparison, in such a case that the each cylinder air intake amount (AFSYLF) is smaller than the stall prevention judging-purpose each cylinder intake amount 2 (STLCHK 2), the stall prevention judging flag 2 (XSTLCHK2) is set to "1 (stall prevention judgment success)", and then, a request for avoiding the engine stop is outputted from the engine stop avoiding control requesting means (ESACRM) 35.

Next, when the request for avoiding the engine stop is outputted from the engine stop avoiding control requiring means 35, the engine stop avoiding control (ESACM) 36 executes a calculating process operation. In other words, in such a case that the stall prevention judging flag 1 (XSTLCHK 1) has been set to "1", or in such a case that the stall prevention judging flag 2 (XSTLCHK 2) has been set to "1", the engine stop avoiding control (ESACM) 36 executes a calculating process operation. In this engine stop avoiding control (ESACM) 36, both a first stall prevention adding amount and a second stall prevention adding amount are calculated in order that the throttle valve 5 is forcibly opened by receiving the drive force of the DC motor 6, while the position sensor signal outputted from the throttle position sensor 22 is neglected. Then, these first and second stall prevention adding amounts are outputted to the above-described adder 33 of FIG. 3. As a consequence, in the above-described adder 33, the first and second stall prevention adding amounts are added to the intake throttle opening degree deviation. In this engine stop avoiding control (ESACM) 36, both a first stole prevention adding amount and a second stole prevention adding amount are calculated in order that the throttle valve 5 is forcibly opened by receiving the drive force of the DC motor 6, while the position sensor signal outputted from the throttle position sensor 22 is neglected. Then, these first and second stole prevention adding amounts are outputted to the above-described adder 33 of FIG. 3. As a consequence, in the above-described adder 33, the first and second stole prevention adding amounts are added to the intake throttle opening degree deviation.

Figure 3:
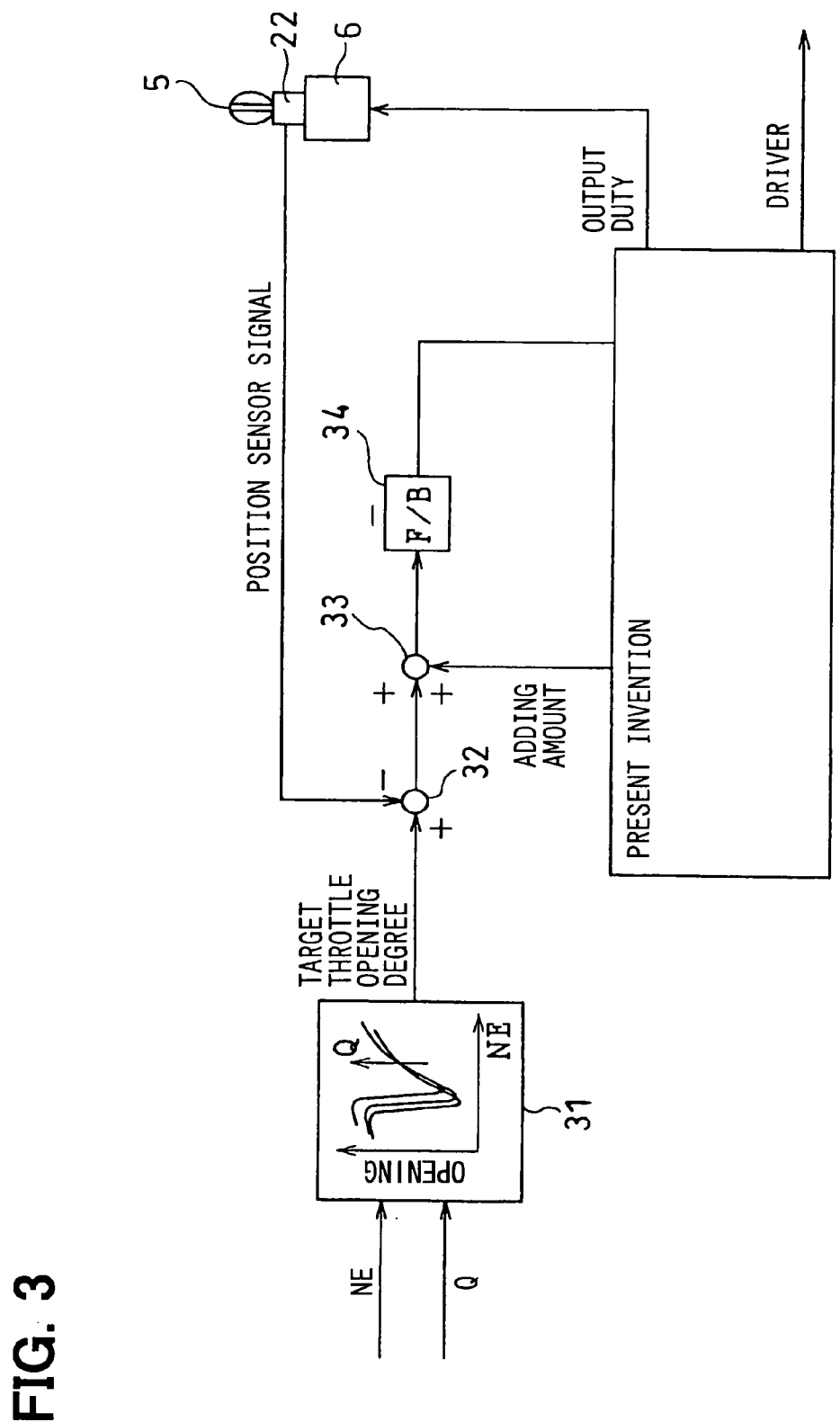
FIG. 3 a block diagram showing a control logic according to the first embodiment.

On the other hand, when the request of avoiding the engine stop is not outputted from the engine stop avoiding control request means 35, in other words, in such a case that the stall prevention judging flag 1 (XSTLCHK 1) is set to "0" and the stall prevention judging flag 2 (XSTLCHK 2) is set to "0", the first and second stall prevention adding amounts are not calculated by the engine stop avoiding control (ESACM) 36, but also, the stall prevention adding amounts are not outputted to the adder 33 of FIG. 3. As a result, in the above-described adder 33, the stall prevention adding amounts are not added to the intake throttle opening degree deviation.

Also, in such a case that the stall prevention adding amounts are calculated in the engine stop avoiding control (ESACM) 36, the abnormal condition detecting means (ACDM) 37 executes a judging process operation. In this abnormal condition detecting means (ACDM) 37, the engine stop avoiding control (ESACM) 36 monitors a total execution number of forcible valve opening operations. In the case that the forcible valve opening operations of the throttle valve 5 are carried out plural numbers larger than, or equal to a predetermined number (for instance, 3) within a predetermined time duration, namely, in the case that an execution frequency (execution numbers) of the engine stop avoiding control operations per unit time is larger than, or equal to an abnormal condition judging valve, this abnormal condition detecting means (ACDM) 37 detects such an abnormal malfunction (line interruption, short-circuit, and output fixing) that the position sensor signal outputted from the throttle position sensor 22 indicates a large opening degree, or detects fixing of opened valve (mechanical fixing) of the throttle valve 5, or such an abnormal condition that the DC motor 6 is driven under abnormal condition. control (ESACM) 36 monitors a total execution number of forcible valve opening operations. In the case that the forcible valve opening operations of the throttle valve 5 are carried out plural numbers larger than, or equal to a predetermined number (for instance, 3) within a predetermined time duration, namely, in the case that an execution frequency (execution numbers) of the engine stop avoiding control operations per unit time is larger than, or equal to an abnormal condition judging valve, this abnormal condition detecting means (ACDM) 37 detects such an abnormal malfunction (line interruption, short-circuit, and output fixing) that the position sensor signal outputted from the throttle position sensor 22 indicates a large opening degree, or detects fixing of opened valve (mechanical fixing) of the throttle valve 5, or such an abnormal condition that the DC motor 6 is driven under abnormal condition.

When the abnormal condition is detected by the abnormal condition detecting means (ACDM) 37, a request for prohibiting a motor energizing operation is outputted to the means 38 for prohibiting the supply of power to the motor (PSPM). As a result, an intake throttle control execution judging flag of the means 38 for prohibiting the supply of power to the motor is set to "0", or set to "1" in other cases. Then, in the case that the intake throttle control execution judging flag (ITCEJ-FLAG) has been set to "0", the output voltage becomes zero volt, so that the supply of power to the DC motor 6 is prohibited, the throttle valve 5 is returned to the fully opened condition by the energizing force by the default spring, and stopping of the engine 1 can be avoided.

In connection with the above-described operation, when the abnormal condition is detected by the abnormal condition detecting means (ACDM) 37, since the means 39 for notifying the abnormal condition to the car driver, the abnormal condition can be notified to the car driver. As the means 39 for notifying the abnormal condition to the driver, the following methods can be conceived, namely, a warning method in which a visual display means such as an abnormal condition warning lamp (indicator lamp) is turned ON so as to notify an abnormal condition to the car driver; another warning method in which an abnormal condition is notified to the car driver by employing such a visual display means for displaying character information on a screen of a monitor mounted on a vehicle; or a further warning method by which an abnormal condition is notified to the car driver by employing an acoustic display means such as an abnormal condition warning buzzer and voice.

Figure 5:
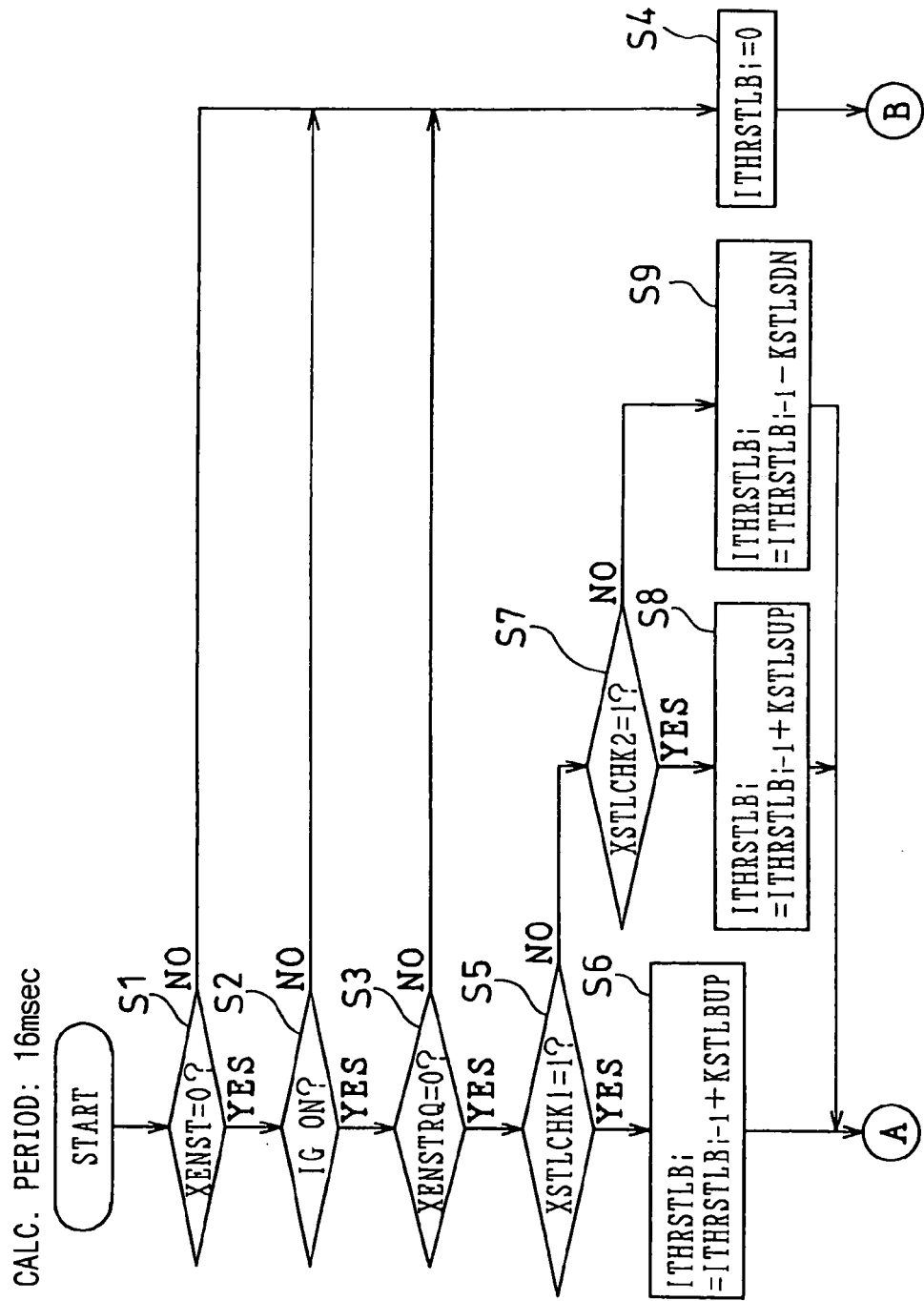
FIG. 5 is a flowchart showing an engine stall prevention control according to the first embodiment.
Figure 6:
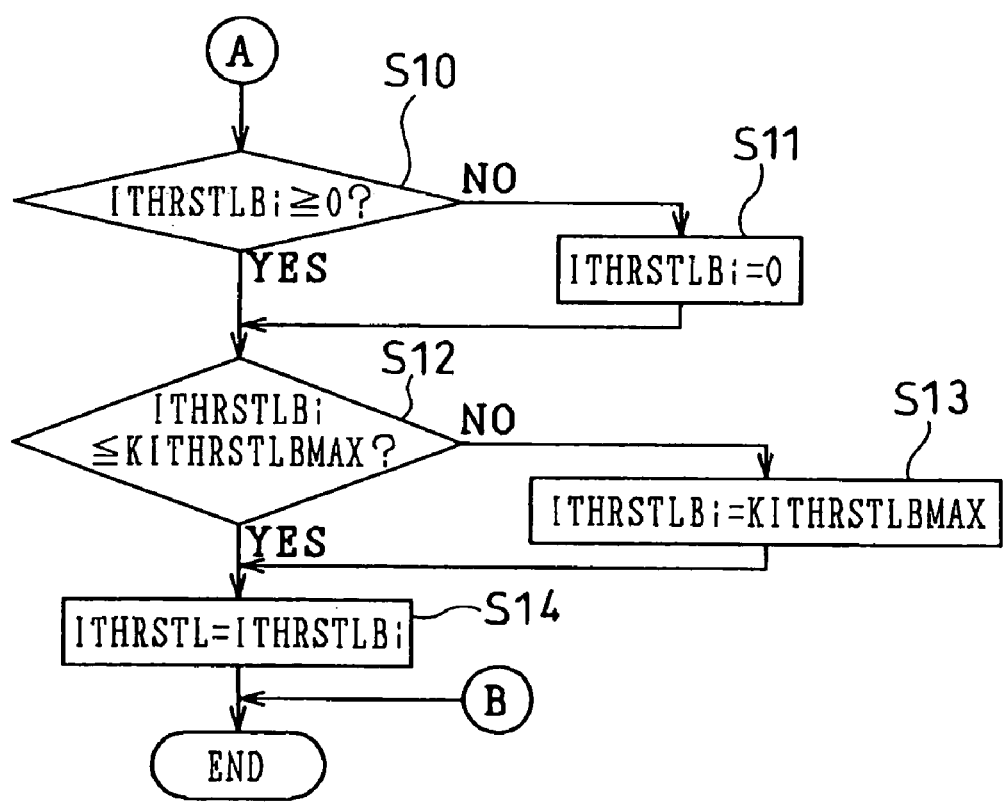
FIG. 6 is a flowchart showing an engine stall prevention control according to the first embodiment.

Referring now to flow charts shown in FIG. 5 and FIG. 6, a description is made of process sequential operations as to an engine stop avoiding control operation which is executed by the engine stop avoiding control (ESACM) 36 of the CPU 8 employed in the ECU 7 when an abnormal condition happens to occur, for instance, when the position sensor signal opening degree is large. This engine stop avoiding control routine of FIG. 5 and FIG. 6 is repeatedly carried out by the CPU 8 every predetermined timing (for instance, 16 msec: calculation time period) after the ignition switch is turned ON (IG·ON). In such a case that after the ignition switch has been once turned ON (IG·ON), this ignition switch is turned OFF (IG·OFF), the engine stop avoiding control routine of FIG. 5 and FIG. 6 is continuously executed for a time duration until a predetermined condition can be satisfied (time duration until predetermined time has elapsed).

In this process sequence, in such a case that the each cylinder air intake amount (AFSCYLF) is smaller than the stall prevention judging-purpose each cylinder intake amounts 1 and 2 (STLCHK 1 and 2) which are determined by the one-dimensional map of the engine revolution number (NE), since a final stall prevention adding amount (ITHRSTL) is added to the intake throttle opening degree deviation (ITHROPDEL), the throttle valve 5 is forcibly opened so as to avoid the engine stall. Subsequently, the process sequence of the engine stop avoiding control based upon the flow charts shown in FIG. 5 and FIG. 6 will now be explained.

First, a judgement is made as to whether or not an engine stop flag (XENST) has been set to "0" (namely, no occurrence of engine stall) in step S1. In such a case that this judgement result becomes YES, another judgement is made as to whether or not the ignition switch is turned ON (IG ON) in step S2. When this judgement result becomes YES, a check is made as to whether or not an engine stop request flag (XEUSTRQ) has been set to "0" (no request for stopping engine is made) in step S3. In the case that this judgement result becomes YES, namely when all of these judgements can become "YES", the process operation is advanced to step S5. Also, in such a case that the judgement result of step S1 becomes NO, or in the case that the judgement result of step S2 becomes NO, or in the case that the judgement result of step S3 becomes NO, in other words, even when any one of these judgements becomes NO, the stall prevention adding amount (ITHRSTLB) is cleared (set to "0") in step S4. Thereafter, the process operation exits from the control routine of FIG. 5 and FIG. 6, and the process operation for the engine stop avoiding control operation is accomplished.

Next, a check is made as to whether or not the stall prevention judging flag (XSTLCHK 1) has been set to "1", in step S5. In the case that this judgement result becomes YES, namely when the judgement can be established, a stall prevention adding amount "large" (first stall prevention adding amount: KSTLBUP) is added to the stall prevention adding amount (ITHRSTLB) so as to update the stall prevention adding amount (ITHRSTLB) (first stall prevention adding means: step S6). Thereafter, the process operation is advanced to step S10.

Also, in such a case that the judgement result of step 55 becomes NO, a check is made as to whether or not a stall prevention judging flag 2 (XSTLCHK 2) has been set to "1"s in step S7. In the case that this judgement result becomes YES, namely when the judgement can be established, a stall prevention adding amount "small" (second stall prevention adding amount: KSTLSUP) is added to the stall prevention adding amount (ITHRSTLB) so as to update the stall prevention adding amount (ITHRSTLB) (second stall prevention adding means: step S8). Thereafter, the process operation is advanced to step S10. It should be noted that the first stall prevention adding amount (KSTLBUP)>the second stall prevention adding amount (KSTLSUP).

Also, in such a case that the judgement result of step S7 becomes NO, namely when all of these judgements cannot be established, a stall prevention subtracting amount (KSTLSDN) is subtracted so as to update the stall prevention adding amount (ITHRSTLB) in step S9.

Next, a judgement is made as to whether or not the stall prevention adding amount (ITHRSTLB) is larger than, or equal to "1" in step S10. In the case that the judgement result becomes NO, namely when the judgement cannot be established, the stall prevention adding amount (ITHRSTLB) is cleared (namely, set to "0") in step S11. Thereafter, the process operation is advanced to step S12.

Also, in the case that the judgement result of the step S10 becomes "YES", namely when the judgement can be established, a check is made as to whether or not the stall prevention adding amount (ITHRSTLB) is smaller than, or equal to a stall prevention adding amount "maximum value" (KITHRSTLBMAX) in step S12. In the case that this judgement result become NO, namely when the judgement cannot be established, the stall prevention adding amount (ITHRSTLB) is set to the stall prevention adding amount "maximum value" (KITHRSTLBMAX) in step S13. Thereafter, the process operation is advanced to step S14.

Also, in the case that the judgement result of step S12 becomes YES, namely when the judgement can be established, the final stall prevention adding amount (ITHRSTL) is set to the stall prevention adding amount (ITHRSTLB) in step S14. Thereafter, the process operation exits from the engine stop avoiding control routine of FIG. 5 and FIG. 6, and then, the process operation of the engine stop avoiding control is ended.

Figure 7:
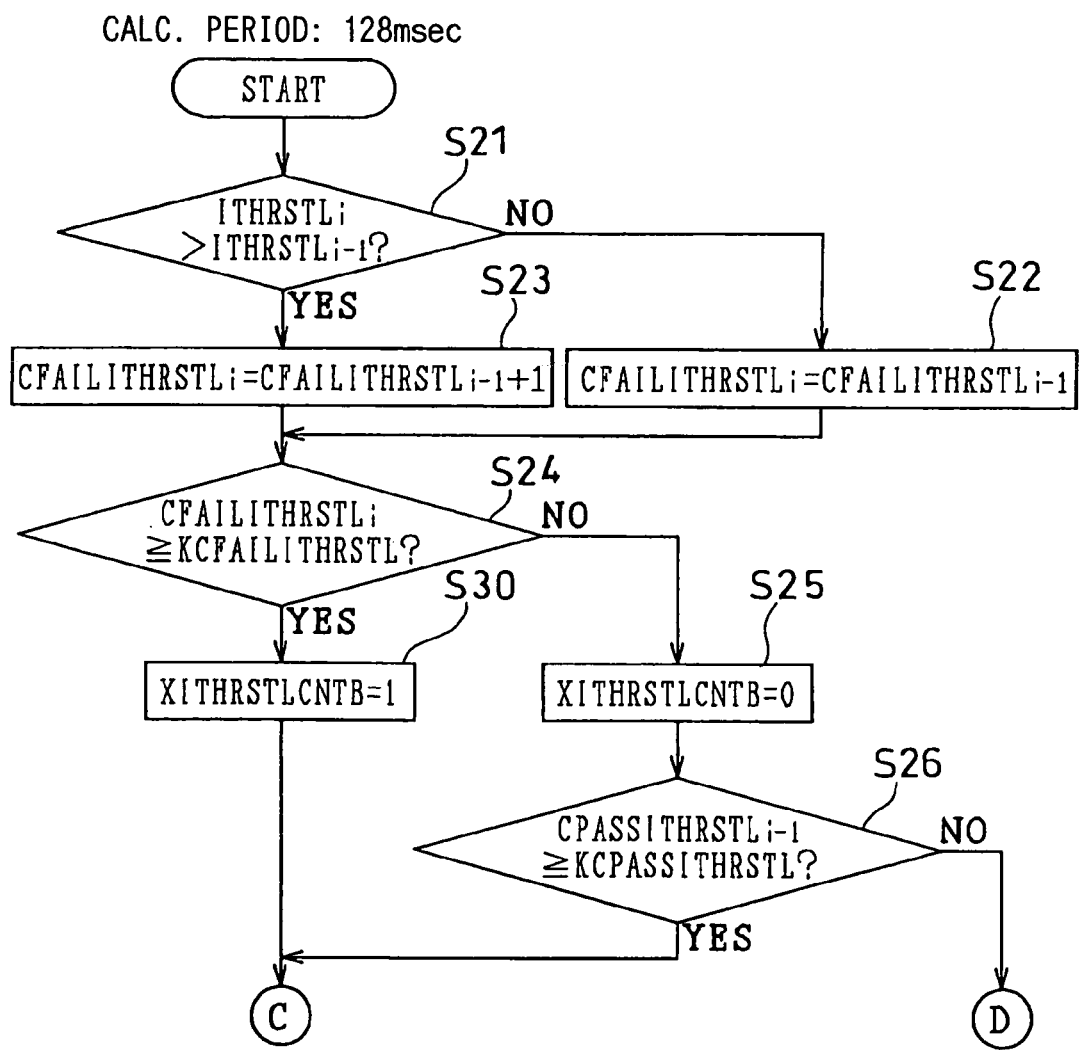
FIG. 7 is a flowchart showing a position sensor signal opening degree "large" abnormal condition control according to the first embodiment.
Figure 8:
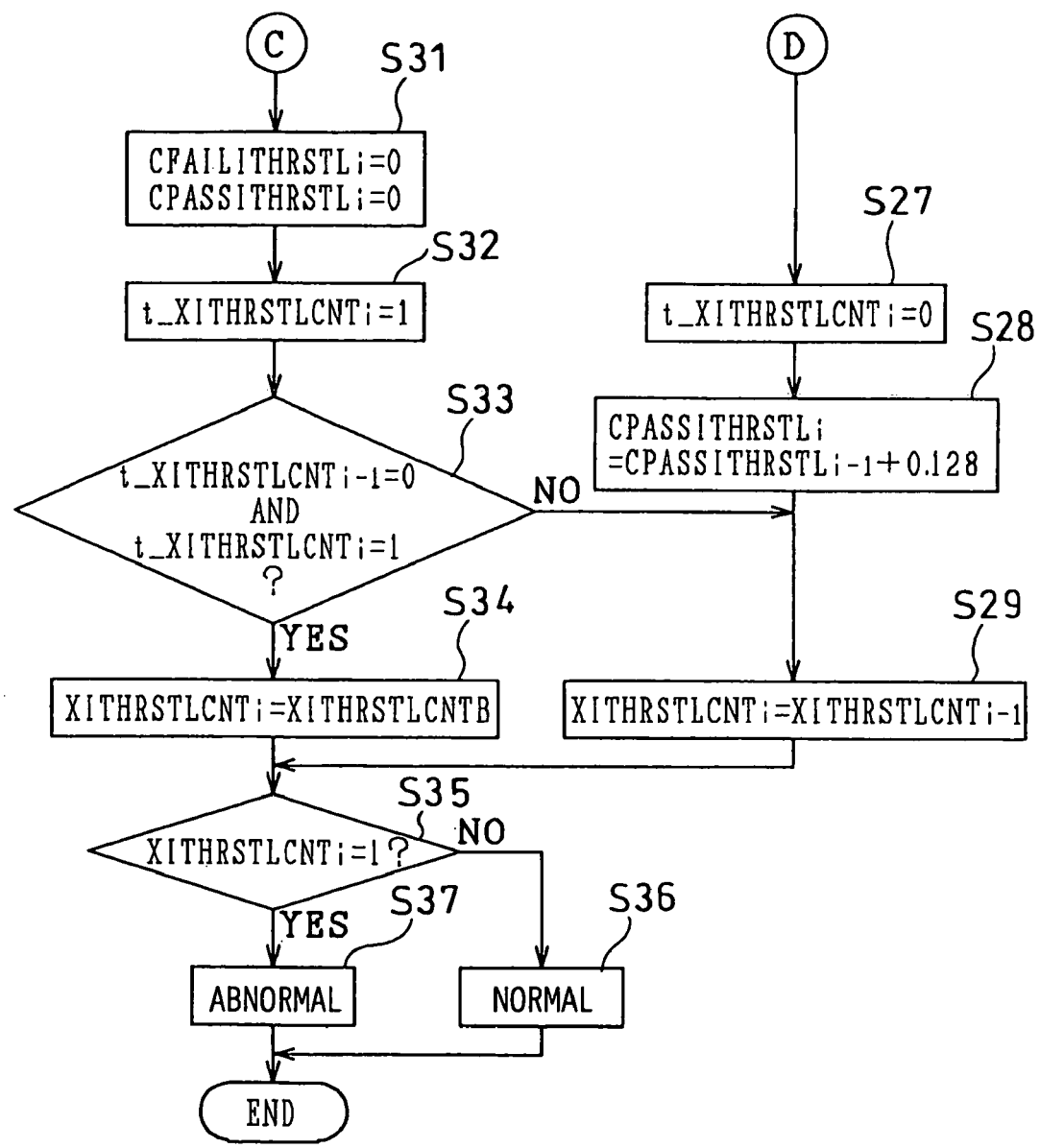
FIG. 8 is a flowchart showing a position sensor signal opening degree "large" abnormal condition control according to the first embodiment.

Referring now to flow charts shown in FIG. 7 and FIG. 8, a description is made of process sequential operations as to a position sensor signal opening degree "large" abnormal condition judging control which is executed by the abnormal condition avoiding control means 37 of the CPU 8 employed in the ECU 7 when an abnormal condition happens to occur, for instance, when the position sensor signal opening degree is large. This position sensor signal opening degree "large" abnormal condition control routine of FIG. 7 and FIG. 8 is repeatedly carried out by the CPU 8 every predetermined timing (for instance, 128 msec: calculation time period) after the ignition switch is turned ON (IG·ON). In such a case that after the ignition switch has been once turned ON (IG·ON), this ignition switch is turned OFF (IG·ON), the position sensor signal opening degree "large" abnormal condition judging control routine of FIG. 7 and FIG. 8 is continuously executed for a time duration until a predetermined condition can be satisfied (time duration until predetermined time has elapsed).

In this process sequence, in such a case that the above-explained engine stop avoiding control is executed plural times which are larger than, or equal to a stall prevention control rushing time abnormal condition judgement valve (KCFAILITHRSTL: for example, three times) per unit time within a stall diagnostic monitoring time adaptive valve (KCPASSITHRSTL: for instance, 3 to 4 seconds), a system abnormal condition is detected. Subsequence, a description is made of the process sequence as to the position sensor signal opening degree "large" abnormal condition judging control based upon the flow charts shown in FIG. 7 and FIG. 8.

First, a judgement is made as to whether or not a present value (ITHRSTLi) of the final stall prevention adding amount of which calculation method has been described is larger than the preceding value (ITHRSTLi−1) in step S21. In the case that this judgement result becomes NO, namely when the judgement cannot be established, the stall prevention control rushing time (CFAILITHRSTL) holds the preceding value in step S22. Thereafter, the process operation is advanced to step S24.

Also, in the case that the judgement result of step S21 becomes YES, namely when the judgement can be established, the CPU 8 judges that the process operation rushes into the stall prevention control, and then, increments the stall prevention control rushing time (CFAILITHRSTL) by "+1" in step A23.

Next, a check is made as to whether or not the stall prevention control rushing time (CFAILITHRSTL) is larger than, or equal to a stall prevention control rushing time abnormal condition judging value (KCFAILITHRSTL) in step S24. In the case that this judgement result becomes NO, namely when the judgement cannot be established, the stall prevention control rushing flag (XITHRSTLCNTB) is set "0" in step S25. Next, a check is made as to whether or not the stall diagnostic monitoring time (CPASSITHRSTL) is larger than, equal to a stall diagnostic monitoring time adaptive value (KCPASSITHRSTL) in step S26. In the case that this judgement result becomes YES, namely when the judgement can be established, the process operation is advanced to step S31.

Also, in the case that this judgement result becomes NO, namely when the judgement cannot be established, a stall prevention control continuous temporary flag (t_XITHRSTLCNT) is set to "0" in step S27. Next, the stall diagnostic monitoring time (CPASSITHRSTL) is incremented by "+0.128" in step S28. Next, the stall prevention control continuous flag (XITHRSTLCNT) is held as the preceding value in step S29. Thereafter, the process operation is advanced to step S35.

Also, in the case that the judgement result of step S24 becomes YES, namely when the judgement can be established, the stall prevention control rushing flag (XITHRSTLCNTB) is set to "1", (step S30). Next, the CPU 8 clears the stall diagnostic monitoring time (CPASSITHRSTL), namely sets to "0" in step S31. Next, the CPU 8 sets the stall prevention control continuous temporary flag (t XITHRSTLCNT) in step S32. Subsequently, the CPU 8 determines whether or not a preceding value (tXITHRSTLCNTi−1) of the stall prevention control continuous temporary flag is equal to "0", and further, a present value (tXITHRSTLCNTi) of the prevention control continuous temporary flag is equal to "1" in step S33. In the case that this judgement result becomes NO, namely when the determination cannot be established, the process operation is advanced to step S29. In this step S29, the stall prevention control continuous flag (XITHRSTLCNT) is held as the preceding value.

Also, in the case that the judgement result of the step S33 becomes YES, namely when the judgement can be established, the CPU 8 sets the stall prevention control continuous flag (XITHRSTLCNT) to the value of the stall prevention control rushing flag (XITHRSTLCNT) in step S34. Next, the CPU 8 determines whether or not the stall prevention control continuous flag (XITHRSTLCNT) has been set to "1 (abnormal condition occurs)" in step S35. In the case that this judgement result becomes NO, namely when the determination cannot be established, the CPU 8 detects the normal condition instep S36. Thereafter, the process operation exits from the position sensor signal opening degree "large" abnormal judging control routine of FIG. 7 and FIG. 8, and then, the process operation of the position sensor signal opening degree "large" abnormal judging control operation is accomplished.

Also, in the case that the judgement result of step S35 is YES, namely when the judgement can be established, the CPU 8 detects, for example, the position sensor signal opening degree "large" abnormal condition in step S37. Thereafter, the process operation exits from the position sensor signal opening degree "large" abnormal judging control routine of FIG. 7 and FIG. 8, and then, the process operation of the position sensor signal opening degree "large" abnormal judging control operation is accomplished.

As previously described, in the electronic throttle controller of this first embodiment, as represented in FIG. 3 and FIG. 4, the following arrangement is made. That is, when the each cylinder air intake amount (AFSCYLF) detected by the air flow meter 21 is smaller than the stall prevention judging-purpose each cylinder intake amount 1 (STLCHK 1), the stall prevention adding amount "large" (first stall prevention adding amount: KSTLBUP) is added to the intake throttle opening degree deviation, and the DC motor 6 is energized (driven) while neglecting the feedback control (intake throttle opening degree deviation and position sensor signal), and then, the engine stop avoiding control operation is requested in such a manner that the opening degree (actual throttle opening degree) of the throttle valve 5 is controlled to be further opened from the actual preceding control position along the valve opening direction.

Also, when the each cylinder air intake amount (AFSCYLF) detected by the air flow meter 21 is smaller than the stall prevention judging-purpose each cylinder intake amount. 2 (STLCHK 2), the stall prevention adding amount "small" (second stall prevention adding amount: KSTLSUP) is added to the intake throttle opening degree deviation, and the DC motor 6 is energized (driven) while neglecting the feedback control (intake throttle opening degree deviation and position sensor signal), and then, the engine stop avoiding control operation is requested in such a manner that the opening degree (actual throttle opening degree) of the throttle valve 5 is controlled to be further opened from the actual preceding control position along the valve opening direction. As a consequence, even in such an assuming case that an abnormal condition signal indicative of the large opening degree is outputted from the throttle position sensor 22, there is no possibility that the throttle opening degree is excessively closed along the valve closing direction, and it is possible to avoid that the engine 1 is brought into the engine stall condition, since such an air intake amount required so as to maintain the predetermined engine revolution speed.

Further, since the abnormal condition detecting means (ACDM) 37 is provided, the abnormal malfunction of the throttle position sensor 22 can be firmly detected, while the engine stall is avoided. This abnormal condition detecting means (ACDM) 37 detects the abnormal malfunction (for instance, position sensor signal opening degree "large" abnormal condition) in the case that the execution number of the engine stall avoiding control is monitored, and then, the engine stall avoiding control is carried out plural times larger than, or equal to a predetermined number (for example, 3) within a predetermined time period. Also, even when the position sensor signal outputted from the throttle position sensor 22 is brought into an instantaneous abnormal status, since there is no possibility that the supply of the electric power to the DC motor 6 is not stopped, no adverse influence is given to the drive condition of the engine 1, but also, the drivability is not deteriorated.

In connection with the above-described case, the following feedback control may be alternatively carried out. That is, after the engine stop avoiding control has been carried out once or twice, if the each cylinder air intake amount (AFSCYLF) detected by the air flow meter 21 becomes larger than, or equal to the stall prevention judging-purpose every cylinder air intake amount 1 (STLCHK 1), then the CPU 8 may alternatively determines that the throttle position sensor 22 is brought into the instantaneous abnormal condition, and this throttle position sensor 22 is again returned to the normal condition, and thus, the CPU 8 may alternatively restart such a feedback control operation that the DC motor 6 is driven based upon the opening degree deviation between the target throttle opening degree and the actual throttle opening degree (position sensor signal) in such a manner that this opening degree deviation is reduced to zero so as to control the throttle opening degree.

Also, since both the motor energizing prohibiting means 38 and the default spring are provided, even when the supply of the electric power to the DC motor 6, power of the engine 1 is not restricted. This default spring holds the throttle valve 5 at the throttle opening degree equivalent to the valve fully opened position in the mechanical manner when the supply of the electric power to the DC motor 6 is stopped. The motor energizing prohibiting means 38 prohibits the energizing operation to the DC motor 6 when the abnormal condition malfunction of the throttle position sensor 22 is detected by the abnormal condition detecting means (ACDM) 37 in the higher precision. As a result, the air intake amount required for maintaining the desirable engine revolution speed can be obtained, so that the stable driving operation of the engine 1 can be maintained.

Also, even in such a case that the engine 1 starts, the air intake amount required to maintain the idle revolution speed can be obtained, and thus, the stable engine starting condition can be achieved. As a result, the engine stall is not induced, and further, the engine 1 is not brought into the starting failure and/or the starting malfunction. Also, the means 39 for notifying the abnormal condition of the throttle position sensor 22 to the car driver in the case that the abnormal condition malfunction of the throttle position sensor 22 is detected in high precision by the abnormal condition detecting means (ACDM) 37 is employed. As a result, this notifying means 39 can prompt the car driver to repair and/or replace the components such as wire harness which connect the throttle position sensor 22 to the ECU 7, and also to replace the throttle position sensor 22 under malfunction by new one.

MODIFICATIONS

In the above-described first embodiment, as the control target value setting means for calculating the control target value (target throttle opening degree) in response to the drive condition of the engine 1, the target throttle opening degree setting means 31 has been provided which calculates the target control value (target throttle opening degree) based upon both the engine revolution number (NE) and either the fundamental injection amount or the command injection amount (Q) Alternatively, the target throttle opening degree setting means (31) may be provided which calculates the target control value (target throttle opening degree) based upon the accelerator opening degree signal outputted from the accelerator position sensor for detecting the depression amount of the accelerator pedal (accelerator operation amount).

What is claimed is:
1. An electronic throttle controller comprising:
   a throttle valve for opening/closing an air intake passage which is communicated with a cylinder of an internal combustion engine;
   an actuator for changing an opening degree of the throttle valve;
   a throttle position sensor for sensing the opening degree of the throttle valve;
   an air intake amount sensor for sensing an amount of air which is sucked to the cylinder of the internal combustion engine;
   a first throttle opening degree control means for driving the actuator based upon deviation between the throttle opening degree sensed by the throttle position sensor and a target control value which is set in correspondence with a drive condition of the internal combustion engine so as to perform a feedback control operation for controlling the opening degree of the throttle valve;
   a second throttle opening degree control means operated in such a manner that when the air intake amount sensed by the air intake amount sensor is smaller than a stall prevention judging value which is set in correspondence with the drive condition of the internal combustion engine, the actuator is driven while neglecting the feedback control operation by the first throttle opening degree control means so as to perform an engine stop avoiding control for controlling to further open the opening degree of the throttle valve along the valve opening direction; and
   an abnormal condition detecting means for detecting an abnormal condition as to at least one of the throttle valve, the actuator, and the throttle position sensor when an execution frequency of the engine stop avoiding control by the second throttle opening degree control means per unit time is larger than, or equal to an abnormal condition judging value.

2. An electronic throttle controller according to claim 1, further comprising:
   a feedback restarting means for restarting the feedback control operation by the first throttle opening degree control means when an execution frequency of the engine stop avoiding control by the second throttle opening degree control means per unit time is smaller than the abnormal condition judging value.

3. An electronic throttle controller according to claim 1, further comprising:
   an energizing prohibition means for prohibiting an energizing operation to the actuator in the case that the abnormal condition detecting means detects the abnormal condition as to at least one of the throttle valve, the actuator, and the throttle position sensor; and
   fully-opened position storage means for holding the throttle valve at a throttle opening degree equivalent to the valve fully-opened position in a mechanical manner when the energizing operation to the actuator is stopped.

4. An electronic throttle controller according to claim 1, further comprising:
   abnormal condition warning means for notifying to a car driver, an abnormal condition as to at least one of the throttle valve, the actuator, and the throttle position sensor in such a case that the abnormal condition detecting means detects the abnormal condition as to at least one of the throttle valve, the actuator, and the throttle position sensor.

5. An electronic throttle controller according to claim 1, wherein
   the second throttle opening degree control means includes:
   a revolution speed detecting means for detecting an engine revolution speed;
   a first stall prevention adding means operated in such a manner that when the air intake amount sensed by the air intake amount sensor is smaller than a first stall prevention judging value which has been set in correspondence with the engine revolution speed detected by the revolution speed detecting means, a first stall prevention adding amount is added to deviation between the throttle opening degree and the target control value; and second stall prevention adding means operated in such a manner that when the air intake amount sensed by the air intake amount sensor is smaller than a second stall prevention judging value which has been set in correspondence with the engine revolution speed detected by the revolution speed detecting means, a second stall prevention adding amount is added to deviation between the throttle opening degree and the target control value; and wherein:

the first stall prevention judging value is set to be smaller than the second stall prevention judging value, and also, the first stall prevention adding amount is set to be larger than the second stall prevention adding amount.

6. A method for controlling an electronic throttle, said method comprising:

controlling a throttle valve to variably open/close an air intake passage which is communicated with a cylinder of an internal combustion engine;

sensing an opening degree of the throttle valve;

sensing an amount of air which is sucked to the cylinder of the internal combustion engine;

controlling the throttle valve based upon deviation between the sensed throttle opening degree and a target control value which is set in correspondence with a drive condition of the internal combustion engine so as to perform a feedback control operation for controlling the opening degree of the throttle valve;

when the sensed air intake amount is smaller than a stall prevention judging value set in correspondence with the drive condition of the internal combustion engine, the throttle valve is driven while neglecting the feedback control operation so as to further open the throttle valve; and detecting an abnormal condition as to at least one of a throttle valve actuator and a throttle position sensor when an execution frequency of the further opening of the throttle valve per unit time is larger than, or equal to an abnormal condition judging value.

7. A method as in claim 6 further comprising:

restarting the feedback control operation when an execution frequency of the further opening of the throttle valve per unit time is smaller than the abnormal condition judging value.

8. A method as in claim 6 further comprising:

prohibiting operation of a throttle valve actuator in the case that an abnormal condition exists as to at least one of the throttle valve, the actuator, and a throttle position sensor; and holding the throttle valve at an opening equivalent to the valve fully-opened position in a mechanical manner when the operation of the actuator is stopped.

9. A method as in claim 6 further comprising:

notifying a car driver of an abnormal condition as to at least one of the throttle valve, a throttle valve actuator, and a throttle position sensor in such a case that an abnormal condition exists as to at least one of the throttle valve, the actuator, and the throttle position sensor.

10. A method as in claim 6 wherein:

engine revolution speed is detected;

when a sensed air intake amount is smaller than a first stall prevention judging value set in correspondence with the detected engine revolution speed, a first stall prevention adding amount is added to a deviation between the throttle opening degree and the target control value; and when a sensed air intake amount is smaller than a second stall prevention judging value set in correspondence with the detected engine revolution speed, a second stall prevention adding amount is added to a deviation between the throttle opening degree and the target control value; and wherein:

the first stall prevention judging value is smaller than the second stall prevention judging value, and also, the first stall prevention adding amount is larger than the second stall prevention adding amount.

* * * * *